United States Patent [19]
McMillan

[11] 4,065,228
[45] Dec. 27, 1977

[54] HYDRAULIC CONTROL FOR VARIABLE DISPLACEMENT PUMPS

[75] Inventor: William D. McMillan, Joliet, Ill.

[73] Assignee: Caterpillar Tractor Co., Peoria, Ill.

[21] Appl. No.: 771,506

[22] Filed: Feb. 24, 1977

[51] Int. Cl.² ............................................. F04B 49/00
[52] U.S. Cl. .................................. 417/212; 417/216; 60/428; 60/449; 60/486
[58] Field of Search .................. 417/212, 216; 60/449, 60/486, 428, 431

[56] References Cited

U.S. PATENT DOCUMENTS

| | | | |
|---|---|---|---|
| 3,543,508 | 12/1970 | Schwab | 60/449 |
| 3,732,036 | 5/1973 | Busby et al. | 417/216 |
| 3,841,795 | 10/1974 | Ferre et al. | 417/216 |
| 3,963,378 | 6/1976 | McMillan | 417/216 |
| 4,008,004 | 2/1977 | Shaw | 60/449 X |

*Primary Examiner*—Edgar W. Geoghegan

*Attorney, Agent, or Firm*—Wegner, Stellman, McCord, Wiles & Wood

[57] ABSTRACT

A hydraulic system for controlling the displacement of a plurality of variable displacement pumps driven by a single prime mover including a source of pilot fluid under pressure including a fixed displacement pump adapted to be driven by the prime mover proportional to the speed thereof, a double-piloted, underspeed valve having an inlet and an outlet, the outlet being adapted to be connected to the variable displacement pumps for controlling displacement thereof, a conduit connecting one of the pilots to the source, an additional conduit, including a flow restricting device, connecting the other of the pilots to the source, and a summing valve having ports adapted to be connected to respective ones of the pumps, a port connected to the second conduit and a port connected to the inlet of the underspeed valve.

5 Claims, 1 Drawing Figure

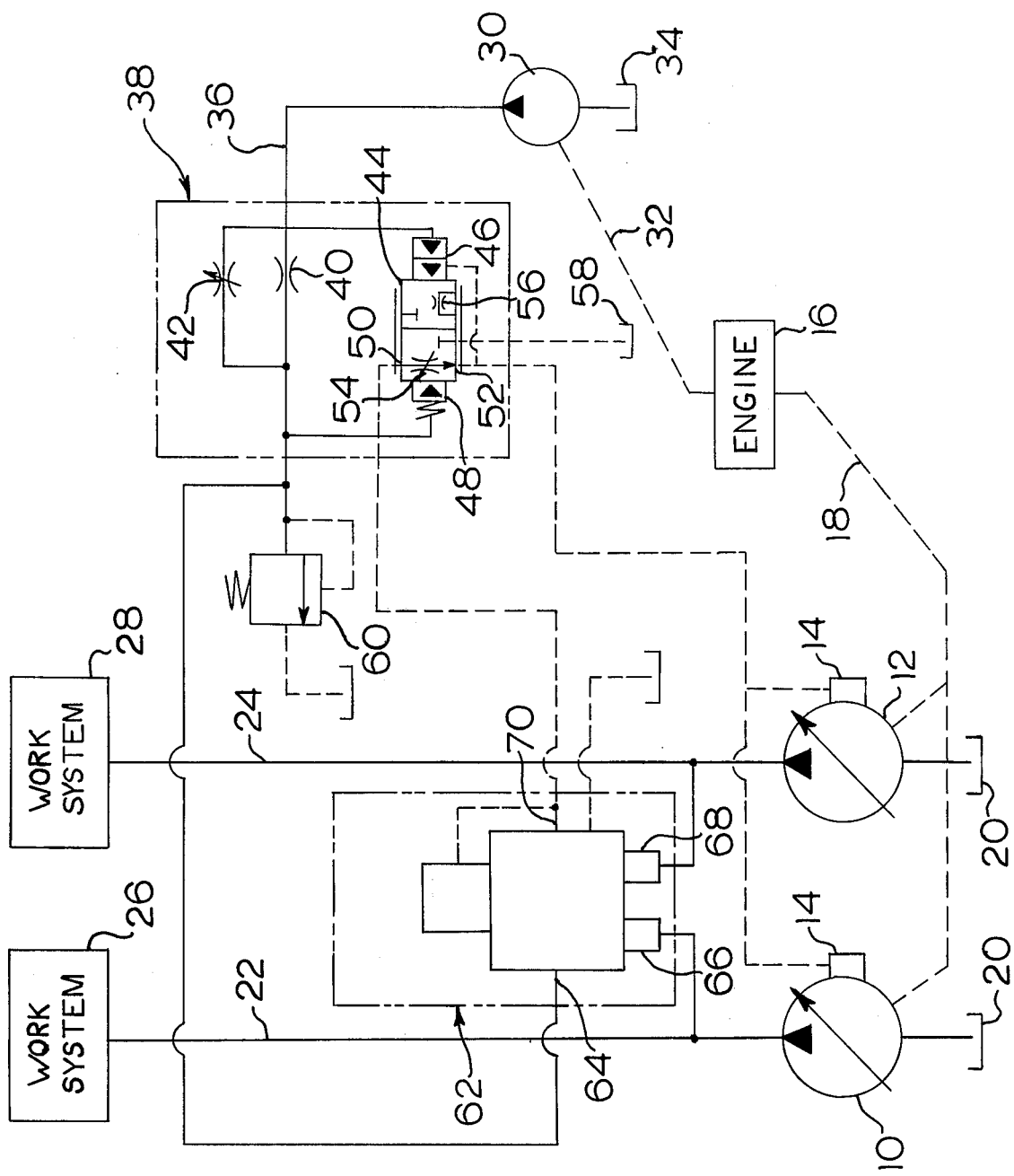

HYDRAULIC CONTROL FOR VARIABLE DISPLACEMENT PUMPS

BACKGROUND OF THE INVENTION

This invention relates to hydraulic systems for controlling the output of at least one variable displacement pump driven by a prime mover in accordance with speed and load conditions.

Many hydraulically actuated work performing systems, as, for example, hydraulic excavators, typically employ a plurality of variable displacement pumps for supplying high pressure hydraulic fluid to a plurality of motors utilized for performing a variety of functions. Typically, the prime mover for driving the pumps, such as an internal combustion engine, is normally set to operate at a predetermined speed when the system is in normal operation. Not infrequently, it is desirable to operate the vehicle at a different speed than the predetermined speed and, in many systems, as soon as the engine speed is reduced, the underspeed valve employed therein signals the pumps to reduce the displacement thereof since the underspeed valve responds to the change in speed as though the engine output was slowed due to lugging.

As a consequence, at speeds reduced from normal, work performing functions may be unnecessarily slowed even though there is ample horsepower in the system for handling the then prevailing load.

In order to overcome this deficiency, it has been proposed to provide a selectively operable, adjustable bypass for the underspeed valve to accommodate lower than normal speed operations without reducing the displacement of the variable displacement pumps. While such a system works well for its intended purpose, it requires the presence of additional components as, for example, conduits, valves, adjustable orifices, etc., and accordingly increases the cost of the overall hydraulic system.

SUMMARY OF THE INVENTION

The present invention is directed to overcoming one or more of the problems set forth above.

According to the present invention, there is provided in a hydraulic system for controlling the output of at least one variable displacement pump driven by a single prime mover, a source of pilot fluid under pressure including a fixed displacement pump adapted to be driven by the prime mover proportional to speed thereof. Means are also provided which define an underspeed control valve connected to the source and having an inlet and an outlet. The outlet is adapted to be connected to the variable displacement pump for controlling the displacement thereof. The system further includes load sensing means having an input connected to the source and adapted to be associated with the variable displacement pumps for sensing the loading thereon. The load sensing means has an output connected to the inlet of the underspeed valve for directing a fluid signal thereto which is proportional to the sensed load. Changes in the speed of the prime mover will not affect displacement of the variable displacement pump unless it is loaded in excess of a predetermined amount.

Other objects and advantages will become apparent from the following specification taken in connection with the accompanying drawings.

DESCRIPTION OF THE DRAWING

The FIGURE is a schematic of a hydraulic system embodying the invention.

DESCRIPTION OF THE PREFERRED EMBODIMENT

An exemplary embodiment of a hydraulic system made according to the invention is intended for use with at least one variable displacement pump and, as seen in the FIGURE, two such pumps 10 and 12 are employed. Typically, the pumps 10 and 12 will be of the type having a swash plate which is moved so as to vary the displacement thereof and the swash plate of each pump includes a hydraulic actuator 14. Each of the pumps 10 and 12 is driven by a single prime mover as, for example, an internal combustion engine 16, through a suitable mechanical connection schematically illustrated at 18.

The pumps 10 and 12 draw hydraulic fluid from reservoirs 20 and direct the same under pressure along lines 22 and 24, respectively, to work performing systems of any desired sort, shown at 26 and 28, respectively.

To control the displacement of the pumps 10 and 12, there is provided a fixed displacement pump 30 having a mechanical connection to the engine 16 schematically illustrated at 32 so as to be driven thereby proportionally to the speed of the engine 16. The fixed displacement pump 30 draws fluid from a reservoir 34 and directs the same through a conduit 36 to an underspeed valve, generally designated 38.

The underspeed valve includes a fixed orifice 40 and a variable orifice 42, which act as flow restricting means, connected in parallel to the line 36. The underspeed valve 38 further includes a double-piloted, infinitely variable spool valve 44 and the upstream side of the orifices 40 and 42 is connected to one pilot 46 of the valve 44, while the downstream side is connected to the other pilot 48 of the valve 44.

The valve 44 further includes an inlet 50 and an outlet 52 which is connected to the actuators 14 of the pumps 10 and 12. The spool of the valve 44 includes a variable orifice 54 which may be set to control the flow of fluid from the inlet 50 to the outlet 52 when the spool is in the position illustrated in the FIGURE. The spool also includes a restricted return passage 56 which connects the outlet 52, and thus the actuators 14, to a reservoir 58 to relax the pressure in the actuators 14, the flow rate being varied according to the position of the spool 44.

In the present case, the actuators 14 are of the type that will command full displacement of the pumps 10 and 12, respectively, whenever fluid below a predetermined pressure is being applied thereto and will reduce the displacement of the pumps 10 and 12 proportionally to the application of fluid above the predetermined pressure thereto.

The downstream side of the orifices 40 and 42 is also connected to a pressure relief valve 60 to preclude overpressurization of the system and to a summing valve, generally designated 62, of conventional construction and which preferably is of the type disclosed in U.S. Pat. 3,732,036, issued May 8, 1973 to Busbey et al. Pilot pressure from the pump 30, after passing through the orifices 40 and 42 is applied to a port 64 of the summing valve while the outputs of the pumps 10 and 12 are applied to ports 66 and 68, respectively. The summing valve 62 includes an outlet port 70 and those skilled in the art will recognize that the summing valve 62 will provide a fluid output at the port 70 of increasing pressure with an increase of the total load on the work systems 26 and 28 as determined by the pressure of the signal applied to the ports 66 and 68 and by the means mentioned previously.

The outlet 70 of the summing valve 62 is connected to the inlet 50 of the underspeed valve 38 with the consequence that when the spool of the valve 44 shifts toward the position illustrated in the FIGURE, the output from the summing valve 62 will be applied to the actuators 14.

The various valves, flow restrictions and the pump 30 are sized, according to art recognized techniques, such that pressure applied to the actuators 14 will be less than that required to reduce pump displacement when the pumps 10 and 12 are not loaded in excess of a predetermined amount.

Thus, in operation, when the engine 16 is turning at its normal speed, the fixed displacement pump 30 will direct pressurized pilot fluid in the manner mentioned previously, with the consequence that the spool of the valve 44 will be shifted from the position illustrated in the FIGURE so that the actuators 14 will be connected to the reservoir, resulting in maximum displacement of the pumps. The shifting of the spool of the valve 44 will occur due to the pressure drop across the orifices 40 and 42. Should the engine 16 be slowed due to lugging, the resultant decrease in fluid flow from the fixed displacement pump 30 will result in a lesser pressure drop occurring with the result that the spool of the valve 44 will shift, proportionally to the lesser pressure drop, toward the position illustrated. At the same time, because of the loading, a high pressure pilot signal will be present at the port 70 of the summing valve 62 and will be directed through or modulated by the variable orifice 54 in the valve 44 to the actuators 14. If the pressure of the signal is greater than the predetermined pressure required to cause the actuators 14 to reduce displacement, indicative of a load in excess of a predetermined amount, it will proportionally reduce the displacement of the pumps 10 and 12 and relieve the overloading on the engine 16.

On the other hand, if the engine 16 is slowed intentionally by the operator thereof, there will be no change in the displacement of the pumps 10 and 12. Even though the spool of the valve 44 will shift toward the position illustrated in the FIGURE due to the reduction in pressure drop across the orifices 40 and 42, because of the fact that the work systems 26 and 28 are not overloaded, there will be a low pressure signal at the output port 70 of the summing valve, with the consequence that the actuators 14 will not reduce displacement of the pumps 10 and 12.

It will also be apparent to those skilled in the art that partial changes in displacement will occur, depending upon the magnitude of the pressure at the outlet port 52 of the underspeed valve 38.

It will be appreciated that the present system maximizes flow from the pumps 10 and 12 to their respective work performing systems 26 and 28 to enable high speed operation for reduced loads at low engine speeds. Only when the demand on the pumps 10 and 12 exceeds a predetermined amount at low speeds will the displacement of the pumps 10 and 12 be altered appropriately.

It will also be appreciated by those skilled in the art that the present system allows maximum speed of the work performing systems at low engine speed without the addition of components such as bypasses, etc., thereby maximizing efficiency without adding to the cost of the system through the provision of extra components.

The embodiments of the invention in which an exclusive property or privilege is claimed are defined as follows:

1. In a hydraulic system for controlling the output of at least one variable displacement pump driven by a single prime mover, the combination of:
    a source of pilot fluid under pressure including a fixed displacement pump adapted to be driven by the prime mover proportional to the speed thereof;
    means defining an underspeed control valve connected to said source and having an inlet and an outlet adapted to be connected to the variable displacement pump (s) for controlling the displacement thereof; and
    load sensing means having an input connected to said source and adapted to be associated with said variable displacement pump(s) for sensing the loading thereon, and having an output connected to said inlet for directing a fluid signal thereto proportional to a sensed load;
    whereby changes in speed of the prime mover will not affect displacement of the variable displacement pump (s) unless it is loaded in excess of a predetermined amount.

2. The hydraulic system of claim 1 especially adapted for controlling a plurality of variable displacement pumps driven by a single prime mover and wherein said load sensing means comprises a summing valve.

3. The hydraulic system of claim 2 wherein said underspeed valve comprises a double piloted valve, and both pilots are connected to said source, there being an orifice interposed between one of said pilots and said source.

4. In a hydraulic system for controlling the displacement of a plurality of variable displacement pumps driven by a single prime mover, the combination of:
    a source of pilot fluid under pressure including a fixed displacement pump adapted to be driven by the prime mover proportional to the speed thereof;
    a double piloted underspeed valve having an inlet and an outlet, said outlet being adapted to be connected to the variable displacement pump(s) for controlling the displacement thereof;
    first means connecting one of said pilots to said source;
    second means, including flow restricting means, connecting the other of said pilots to said source; and
    a summing valve having ports adapted to be connected to respective ones of said pumps, a port connected to said second means and a port connected to said inlet.

5. A work performing system including the hydraulic system of claim 4 further including a plurality of variable displacement pumps, means connecting said outlet to said pumps, and a single prime mover for driving said pumps.

* * * * *